(12) United States Patent
Katz et al.

(10) Patent No.: US 6,321,066 B1
(45) Date of Patent: Nov. 20, 2001

(54) METHOD AND APPARATUS FOR DIRECTIONAL RADIO COMMUNICATION

(75) Inventors: Marcos Katz, Oulu; Matti Kiiski, Oulunsalo, both of (FI)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/171,034

(22) PCT Filed: Feb. 13, 1997

(86) PCT No.: PCT/EP97/00667

§ 371 Date: Dec. 22, 1998

§ 102(e) Date: Dec. 22, 1998

(87) PCT Pub. No.: WO98/36598

PCT Pub. Date: Aug. 20, 1998

(51) Int. Cl.[7] .................................................. H04Q 3/22
(52) U.S. Cl. ..................... 455/25; 455/562; 455/456; 455/522
(58) Field of Search ............................... 455/561, 562, 455/446, 456, 522, 67.1, 25, 65, 129, 127; 342/372, 373, 374, 375; 375/144

(56) References Cited

U.S. PATENT DOCUMENTS 5,621,752 * 4/1997 Antonio et al. ....................... 375/144
5,680,142 * 10/1997 Smith et al. ............................ 455/65
5,818,385 * 10/1998 Bartholmew .......................... 455/456
5,924,020 * 7/1999 Forssen et al. ....................... 455/129

FOREIGN PATENT DOCUMENTS

0647978 A2   4/1995   (EP) .
0729285 A2   8/1996   (EP) .

OTHER PUBLICATIONS

PCT International Search Report WO 98/36598.

* cited by examiner

Primary Examiner—Lester G. Kincaid
(74) Attorney, Agent, or Firm—Perman & Green, LLP

(57) ABSTRACT

A method of directional radio communication in a mobile communication network between a first station and a second mobile station includes the following steps. Signals transmitted by the second station are received at the first station. A parameter representative of the distance between the second station and the first station is monitored. A signal beam is transmitted from the first station to the second station, the angular spread of the signal beam transmitted by the first station being dependent on the distance between the first and second stations.

11 Claims, 5 Drawing Sheets

METHOD AND APPARATUS FOR DIRECTIONAL RADIO COMMUNICATION

BACKGROUND OF THE INVENTION

The present invention relates to a method and apparatus for directional radio communication in which signals between a first station and a second station may be transmitted only in certain directions. In particular, but not exclusively, the present invention is applicable to cellular communication networks using space division multiple access.

BRIEF DESCRIPTION OF RELATED DEVELOPMENT

With currently implemented cellular communication networks, a base transceiver station (BTS) is provided which transmits signals intended for a given mobile station (MS), which may be a mobile telephone, throughout a cell or cell sector served by that base transceiver station. However, space division multiple access (SDMA) systems have now been proposed. In a space division multiple access system, the base transceiver station will not transmit signals intended for a given mobile station throughout the cell but will only transmit the signal in the beam direction from which a signal from the mobile station is received. SDMA systems may also permit the base transceiver station to determine the direction from which signals from the mobile station are received.

SDMA systems may allow a number of advantages over existing systems to be achieved. In particular, as the beam which is transmitted by the BTS may only be transmitted in a particular direction and accordingly may be relatively narrow, the power of the transceiver can be concentrated into that narrow beam. It is believed that this results in a better signal to noise ratio with both the signals transmitted from the base transceiver station and the signals received by the base transceiver station. Additionally, as a result of the directionality of the base transceiver station, an improvement in the signal to interference ratio of the signal received by the base transceiver station can be achieved.

SUMMARY OF THE INVENTION

Furthermore, in the transmitting direction, the directionality of the BTS allows energy to be concentrated into a narrow beam so that the signal transmitted by the BTS can reach far away located mobile stations with lower power levels than required by a conventional BTS. This may allow mobile stations to operate successfully at greater distances from the base transceiver station which in turn means that the size of each cell or cell sector of the cellular network can be increased. As a consequence of the larger cell size, the number of base stations which are required can also be reduced leading to lower network costs. SDMA systems generally require a number of antenna elements in order to achieve the required plurality of different beam directions in which signals can be transmitted and received. The provision of a plurality of antenna elements increases the sensitivity of the BTS to received signals. This means that larger cell sizes do not adversely affect the reception of signals by the BTS from mobile stations.

SDMA systems may also increase the capacity of the system, that is the number of mobile stations which can be simultaneously supported by the system is increased. This is due to the directional nature of the communication which means that the BTS will pick up interference from mobile stations in other cells using the same frequency. The BTS will generate less interference to other mobile stations in other cells using the same frequency when communicating with a given MS in the associated cell.

Ultimately, it is believed that SDMA systems will allow the same frequency to be used simultaneously to transmit to two or even more different mobile stations which are arranged at different locations within the same cell. This can lead to a significant increase in the amount of traffic which can be carried by cellular networks.

SDMA systems can be implemented in analogue and digital cellular networks and may be incorporated in the various existing standards such as GSM, DCS 1800, TACS, AMPS and NMT. SDMA systems can also be used in conjunction with other existing multiple access techniques such as time division multiple access (TDMA), code division multiple access (CDMA) and frequency division multiple access (FDMA) techniques.

One problem with SDMA systems is that the direction in which signals should be transmitted to a mobile station needs to be determined. In certain circumstances, a relatively narrow beam will be used to send a signal from a base transceiver station to a mobile station. Therefore, the direction of that mobile station needs to be assessed reasonably accurately. One problem with SDMA systems is that although the signals from mobile stations which are beyond a certain distance from the BTS are generally only received from one or only a few different beam directions, signals from mobile stations which are relatively close to base transceiver stations appear to come from a large number of beam directions. This is because the signals from the mobile station are reflected from, for example, nearby buildings and a relatively large number of those reflected signals will be received by the base transceiver station from a large number of different beam directions.

An additional problem is that the direction in which a signal is to be transmitted by the BTS to the mobile station is determined on the basis of the uplink signals received by the BTS from the mobile station. However, the frequencies of the downlink signals transmitted from the mobile station to the BTS are different from the frequencies used for the signals transmitted by the BTS to the mobile station. The difference in the frequencies used in the uplink and downlink signals means that the behaviour of the channel in the uplink direction may be different from the behaviour of the channel in the downlink direction. Thus the optimum direction determined for the uplink signals will not always be the optimum direction for the downlink signals.

It is therefore an aim of certain embodiments of the present invention to address difficulties caused by these problems.

According to a first aspect of the present invention, there is provided a method of directional radio communication in a mobile communication network between a first station and a second mobile station, said method comprising the steps of:

receiving at said first station a signal transmitted by said second station;

monitoring a parameter representative of the distance between the second station and the first station; and transmitting a signal beam from said first station to said second station, wherein the angular spread of the signal beam transmitted by the first station is dependent on the distance represented by said parameter.

By varying the angular spread of the signal beam transmitted by the first station in dependence on the distance parameter between the first and second stations, the difference in behaviour resulting from the second station either being close to or far from the first station can be compensated for.

The distance parameter may be monitored at the first station. Preferably, the distance parameter is determined based on signals received by the first station from the second station. In one embodiment, the distance parameter is the angular spread of the signal received by the first station from the second station. When the first station is relatively far from the second station, the signal received by the first station will have a relatively small angular spread whilst if the second station is relatively close to the first station, the signal will be received with a relatively large angular spread. It should be appreciated that this technique will not give an absolute indication of the distance but will nevertheless provide sufficient information in order to allow the angular spread of the signal beam to be transmitted by the first station to be determined.

In an alternative embodiment, the distance parameter is determined based on the length of time taken for the signal from the second station to reach the first station. Said distance parameter may be timing advance information which is normally provided for controlling communication of data between the mobile station and the first station. For example, if embodiments of the present invention were used in conjunction with cellular communication networks using a time division multiple access system, the signal from the second station would be allocated a predetermined time slot. Timing advance information ensures that the signal which is transmitted by the second station is within its allocated time slot. It is unlikely that this will be an absolute distance measurement but will indicate an approximate distance between the first and second stations.

It should be appreciated that in some embodiments the distance parameter can be independently determined and that information can then be used by the first station to determine the angular spread of the signal.

Preferably, the angular spread of the radiation beam is selectable from a first relatively wide beam and a second relatively narrow beam, wherein the first wide beam is selected if the distance between the first station and the second station is less than a predetermined distance and the second beam is selected if the distance between the first station and the second station is less than the predetermined distance. The predetermined distance may be set depending on the environment between the first and second station. In one embodiment, there may only be two possible angular spread values which can be used. Alternatively, the angular spread may have a range of different values depending on the distance parameter. In this situation, there may be a multiplicity of different angular spread values which can be selected. The angular spread values selectable may be discrete values or may have any required value. For example, if the first station is able to transmit a signal beam in N possible different directions, when the first station and second station are greater than the predetermined distance apart, the angular spread may correspond to one direction or possibly two. However, when the distance between the first and second station is less than the predetermined distance, the angular spread may correspond to at least half the total number of directions and even all the directions. In both cases beams used could be determined by an algorithm.

Preferably, the power of the signal beam transmitted by the first station is dependent on the distance parameter. The power of the signal beam being transmitted by the first station may be relatively low if the second station is close to the first station and relatively high if the second station is relatively far from the first station. It is preferred that the transmission power of a first wide beam is less than the transmission power of the second narrow beam. In some embodiments of the present invention, the power of the beam may only have two values, a relatively low value and a higher value. Alternatively, the power of the signal beam can be varied to have a range of different values depending on the distance parameter. The power of the signal beam transmitted by the first station may be calculated so as to be proportional to the angular spread of the transmitted beam. If the beam is relatively narrow, then the power may be relatively high whilst if the beam is a relatively wide, the power may be relatively low. Some closed or open loop power control could be used to control the power. In GSM, closed loop control is used.

When the second station is relatively far from the first station, for example at a distance greater than the predetermined distance, a number of different methods can be used for controlling which of a plurality of beam directions are used. For example, the first station may transmit a signal to the second station in one principal beam direction and in at least one other auxiliary beam direction, the at least one auxiliary beam being adjacent to the principal beam. The ratio of the power of the at least one auxiliary beam to the power of the principal beam may be proportional to the ratio of the strength of the signals received by the first station in that at least one auxiliary direction to said strength of the signals received by the first station in the principal beam direction. Alternatively, where a signal is received from the second station by the first station from two different directions, a first direction corresponding to the beam direction from which the signal is first received and a second direction corresponding to the beam direction from which the signal having the greatest signal strength is received, then the first station may transmit signals in both of said first and second beam directions.

In a further modification, the first station is arranged to detect first and second signals transmitted from the second station, with the second signal being transmitted after the first signal. The directions from which each of the first and second signals received is determined. The first station transmits a signal to the second station. However, when it is determined that the first and second signals from the second station are received by the first station from two different beam directions, a signal is transmitted by the first station to the second station in both the said different beam directions.

According to a second aspect of the present invention, there is provided a first station for directional radio communication in a mobile communication network with a second mobile station, said first station comprising:

receiver means for receiving a signal transmitted by said second station;

transmitter means for transmitting a signal beam from the first station to the second station; and control means for selectively determining the angular spread of a signal beam for transmitting a signal, said control means being arranged to control said transmitter means so that the angular spread of the signal beam transmitted by the first station is dependent on a parameter representative of the distance between the first and second stations.

Preferably, the first station comprises determining means for determining the distance parameter. The distance parameter may be determined by determining means based on the signals received by the first station from the second station. The determining means may determine the angular spread of the signal received by the first station from the second station and use this to determine the distance parameter. Alternatively, the determining means may determine the distance parameter based on the length of time taken for the signal from the second station to reach the first station.

In an alternative embodiment, the first station may receive independently information on the distance parameter.

The control means may control the angular spread of the transmitted beam to be a first relatively wide beam if the distance between the first and second stations is greater than a predetermined distance and to be a second relatively narrow beam if the distance between the first and second stations is less than the predetermined distance. Preferably, the transmission power of the first relatively wide beam is less than the transmission power of the second, narrow beam. Thus, the control means may control the transmitter means to transmit a relatively wide, relatively low power beam when the first station is relatively close to the second station and a relatively high power, narrow beam if the second station is relatively far from the second station.

At least one of the receiver means and the transceiver means is provided by a directional antenna array. The receiver means and the transmitter means may be provided by a single antenna array. This antenna array may be a phased antenna array or may comprise a plurality of separate directional antennae elements.

It should be appreciated that embodiments of the present invention can be used in cellular communications network. The first station may comprise a base transceiver station whilst the second station may be mobile station. However, it will be appreciated that embodiments of the present invention have applications to other directional radio communication systems where the first and second stations may both be mobile or may both be fixed.

It should also be appreciated that the angular spread is defined in terms of the angular spread of the beam. In embodiments of the present invention, the required angular spread may be achieved by providing a plurality of beams. For example, a narrow angular spread may be achieved by only using one or two signal beams whilst the wide angular spread could be achieved by using four or more adjacent beams.

According to a third aspect of the present invention, there is provided a method of directional radio communication in a cellular mobile communication network between a base station and a mobile station, said method comprising:

receiving at said base station a signal transmitted by said mobile station;

monitoring a parameter representative of the distance travelled by said signal between the mobile station and the base station; and selectively determining the angular spread of a radiation beam for transmitting a signal from said base station to said mobile station in dependence on the distance represented by said parameter, wherein the angular spread of the beam transmitting said signal is reduced for an increased distance.

DETAILED DESCRIPTION OF THE PREFERRED EMBODIMENT

Figure 1:
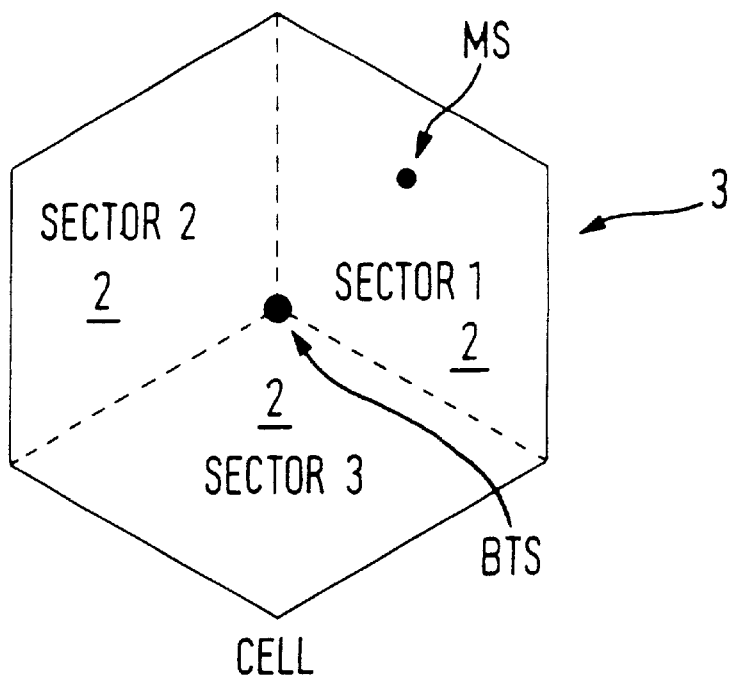
FIG. 1 shows a schematic view of a base transceiver station (BTS) and its associated cell sectors.

Reference will first be made to FIG. 1 in which three cell sectors 2 defining a cell 3 of a cellular mobile telephone network are shown. The three cell sectors 2 are served by respective base transceiver stations (BTS) 4. Three separate base transceiver stations 4 are provided at the same location. Each BTS 4 has a separate transceiver which transmits and receives signals to and from a respective one of the three cell sectors 2. Thus, one dedicated base transceiver station is provided for each cell sector 2. The BTS 4 is thus able to communicate with mobile stations (MS) such as mobile telephones which are located in respective cell sector 2.

The present embodiment is described in the context of a GSM (Global System for Mobile Communication) network. In the GSM system, a frequency/time division multiple access F/TDMA system is used. Data is transmitted between the BTS 4 and the MS in bursts. The data bursts include a training sequence which is a known sequence of data. The purpose of the training sequence will be described hereinafter. Each data burst is transmitted in a given frequency band in a predetermined time slot in that frequency band. The use of a directional antenna array allows space division multiple access also to be achieved. Thus, in embodiments of the present invention, each data burst will be transmitted in a given frequency band, in a given time slot, and in a given direction. An associated channel can be defined by a given data burst transmitted in the given frequency, in the given time slot, and in the given direction. As will be discussed in more detail hereinafter, in some embodiments of the present invention, the same data burst is transmitted in the same frequency band, in the same time slot but in two different directions.

Figure 2:
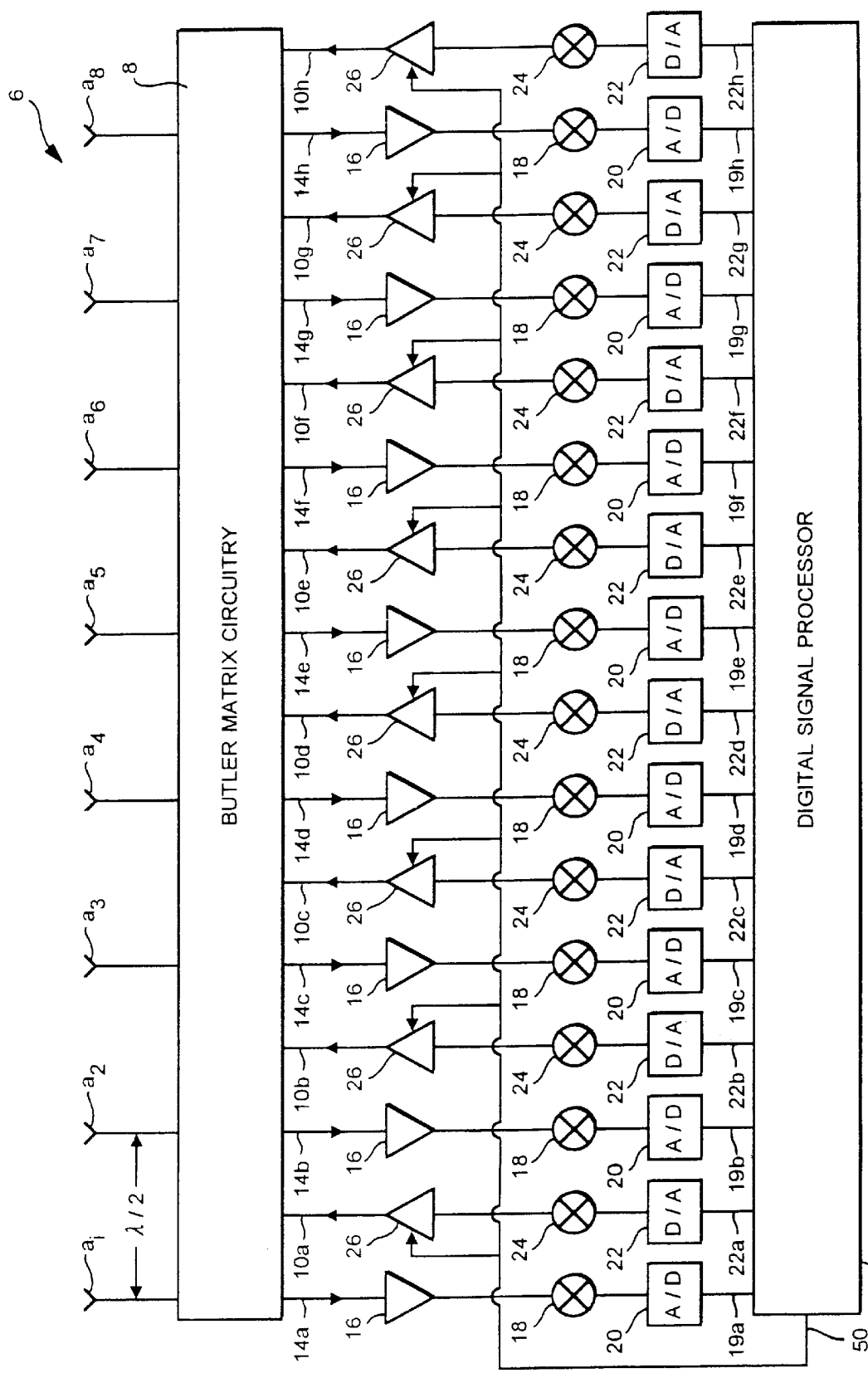
FIG. 2 shows a simplified representation of an antenna array and the base transceiver station.

FIG. 2 shows a schematic view of one antenna array 6 of one BTS 4 which acts as a transceiver. It should be appreciated that the array 6 shown in FIG. 2 only serves one of the three cell sectors 2 shown in FIG. 1. Another two antenna arrays 6 are provided to serve the other two cell sectors 2. The antenna array 6 has eight antenna elements $a_1 \ldots a_8$. The elements $a_1 \ldots a_8$ are arranged to have a spacing of a half wavelength between each antenna element $a_1 \ldots a_8$ and are arranged in a horizontal row in a straight line. Each antenna element $a_1 \ldots a_8$ is arranged to transmit and receive signals and can have any suitable construction. Generally, each antenna element $a_1 \ldots a_8$ will be a directional antenna and, for example, each antenna element may be a dipole antenna or a patch antenna or any other suitable antenna. The eight antenna elements $a_1 \ldots a_8$ together define a phased array antenna 6.

Figure 3:
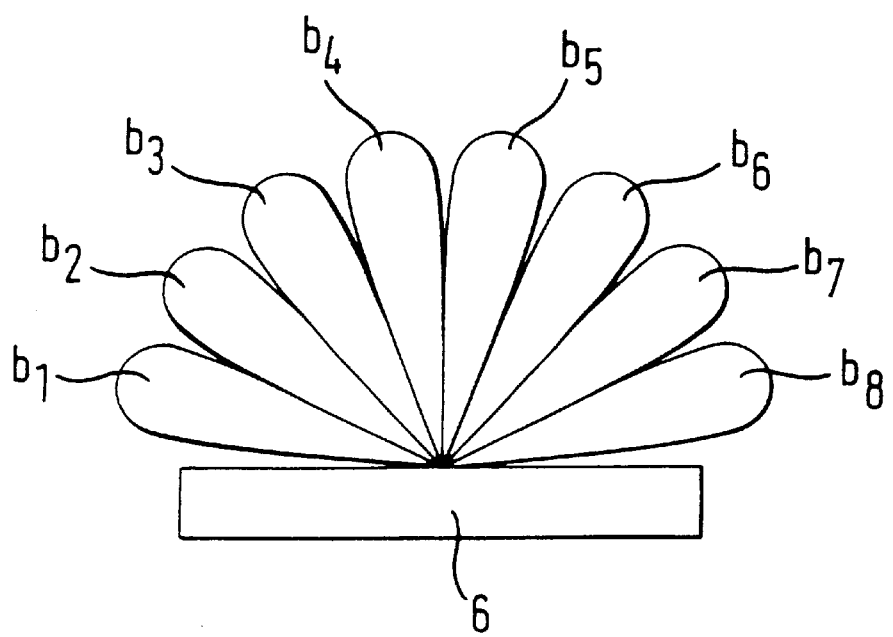
FIG. 3 shows the fixed beam pattern provided by the antenna array of FIG. 2.

As is known, each antenna element $a_1 \ldots a_8$ of the phased array antenna 6 is supplied with the same signal to be transmitted to a mobile station MS. However, the phases of the signals supplied to the respective antenna elements $a_1 \ldots a_8$ are shifted with respect to each other. The differences in the phase relationship between the signals supplied to the respective antenna elements $a_1 \ldots a_8$ gives rise to a directional radiation pattern. Thus, a signal from the BTS 4 may only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element $a_1 \ldots a_8$. In this regard, reference is made to FIG. 3 which illustrates the directional radiation pattern which is achieved with the antenna array 6. The antenna array 6 can be controlled to provide a beam $b_1 \ldots b_8$ in any one of the eight directions illustrated in FIG. 3. For example, the antenna array 6 could be controlled to transmit a signal to a MS only in the direction of beam $b_5$ or only in the direction of beam $b_6$. As will be discussed in further detail hereinafter, it is possible also to control the antenna array 6 to transmit a signal in more than one beam direction at the same time. For example, a signal may be transmitted in the two directions defined by beam $b_5$ and beam $b_6$. FIG. 3 is only a schematic representation of the eight possible beam directions which can be achieved with the antenna array 6. In practice, however, there will in fact be an overlap between adjacent beams to ensure that all of the cell sector 2 is served by the antenna array 6.

The relative phase of the signal provided at each antenna element $a_1 \ldots a_8$ is controlled by Butler matrix circuitry 8 so that a signal can be transmitted in the desired beam direction or directions. The Butler matrix circuitry 8 thus provides a phase shifting function. The Butler matrix circuitry 8 has eight inputs 10a–h from the BTS 4 and eight outputs, one to each antenna element $a_1 \ldots a_8$. The signals received by the respective inputs 10a–h comprise the data bursts to be transmitted. Each of the eight inputs 10a–h represents the beam direction in which a given data burst could be transmitted. For example, when the Butler matrix circuitry 8 receives a signal on the first input 10a, the Butler matrix circuitry 8 applies the signal provided on input 10a to each of the antenna elements $a_1 \ldots a_8$ with the required phase differences to cause beam $b_1$ to be produced so that the data burst is transmitted in the direction of beam $b_1$. Likewise, a signal provided on input 10b causes a beam in the direction of beam $b_2$ to be produced and so on.

As already discussed, the antenna elements $a_1 \ldots a_8$ of the antenna array 6 receive signals from a MS as well as transmit signals to a MS. A signal transmitted by a MS will generally be received by each of the eight antenna elements $a_1 \ldots a_8$. However, there will be a phase difference between each of the signals received by the respective antenna elements $a_1 \ldots a_8$. The Butler matrix circuitry 8 is therefore able to determine from the relative phases of the signals received by the respective antenna elements $a_1 \ldots a_8$ the beam direction from which the signal has been received. The Butler matrix circuitry 8 thus has eight inputs, one from each of the antenna elements $a_1 \ldots a_8$ for the signal received by each antenna element. The Butler matrix circuitry 8 also has eight outputs 14a–h. Each of the outputs 14a to 14h corresponds to a particular beam direction from which given data bursts could be received. For example, if the antenna array 6 receives a signal from a MS from the direction of beam $b_1$, then the Butler matrix circuitry 8 will output the received signal on output 14a. A received signal from the direction of beam $b_2$ will cause the received signal to be output from the Butler matrix circuitry 8 on output 14b and so on. In summary, the Butler matrix circuitry 8 will receive on the antenna elements $a_1 \ldots a_8$ eight versions of the same signal which are phase shifted with respect to one another. From the relative phase shifts, the Butler matrix circuitry 8 determines the direction from which the received signal has been received and outputs a signal on a given output 14a–h in dependence on the direction from which the signal has been received.

It should be appreciated that in some environments, a single signal or data burst from a MS may appear to come from more than one beam direction due to reflection of the signal whilst it travels between the MS and the BTS 4, provided that the reflections have a relatively wide angular spread. The Butler matrix circuitry 8 will provide a signal on each output 14a–h corresponding to each of the beam directions from which a given signal or data burst appears to come. Thus, the same data burst may be provided on more than one output 14a–h of the Butler matrix circuitry 8. However, the signal on the respective outputs 14a–h may be time delayed with respect to each other.

Each output 14a–h of the Butler matrix circuitry 8 is connected to the input of a respective amplifier 16 which amplifies the received signal. One amplifier 16 is provided for each output 14a–h of the Butler matrix circuitry 8. The amplified signal is then processed by a respective processor 18 which manipulates the amplified signal to reduce the frequency of the received signal to the baseband frequency so that the signal can be processed by the BTS 4. To achieve this, the processor 18 removes the carrier frequency component from the input signal. Again, one processor 18 is provided for each output 14a–h of the Butler matrix circuitry 8. The received signal, which is in analogue form, is then converted into a digital signal by an analogue to digital (A/D) converter 20. Eight A/D converters 20 are provided, one for each output 14a–h of the Butler matrix circuitry 8. The digital signal is then input to a digital signal processor 21 via a respective input 19a–h for further processing.

The digital signal processor 21 also has eight outputs 22a–h, each of which outputs a digital signal which represents the signal which is to be transmitted to a given MS. The output 22a–h selected represents the beam direction in which the signal is to be transmitted. That digital signal is converted to an analogue signal by a digital to analogue (D/A) converter 23. One digital to analogue converter 23 is provided for each output 22a–h of the digital signal processor 21. The analogue signal is then processed by processor 24 which is a modulator which modulates onto the carrier frequency the analogue signal to be transmitted. Prior to the processing of the signal by the processor 24, the signal is at the baseband frequency. The resulting signal is then amplified by an amplifier 26 and passed to the respective input 10a–h of the Butler matrix circuitry 8. A processor 24 and an amplifier 26 are provided for each output 22a–h of the digital signal processor 21.

Figure 4:
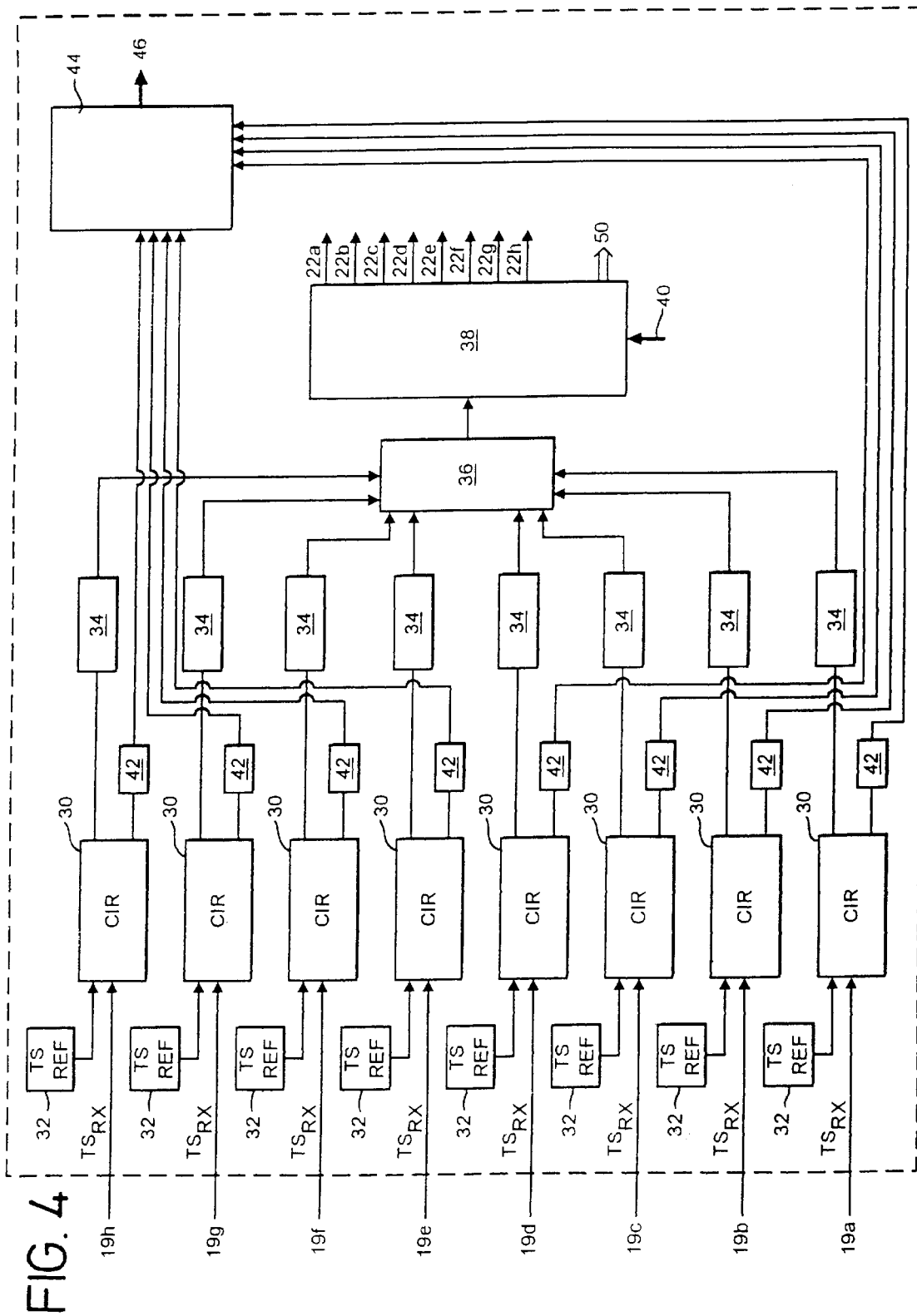
FIG. 4 shows a schematic view of the digital signal processor FIG. 2.
Figure 5A:
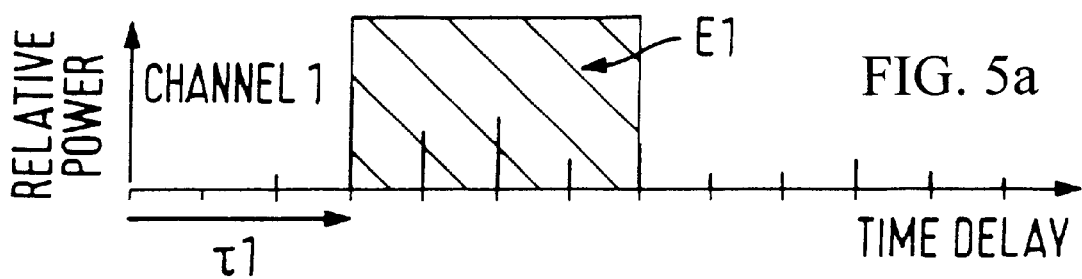
FIGS. 5a–5d illustrate the channel impulse response for four channels, out of eight channels.
Figure 5B:
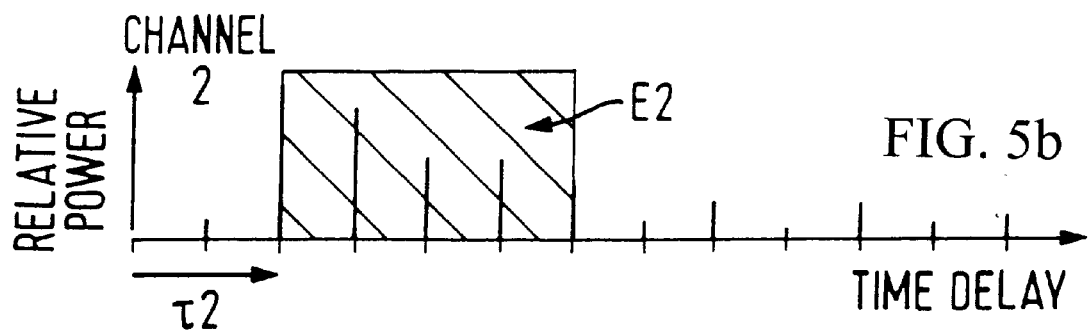
Figure 5C:
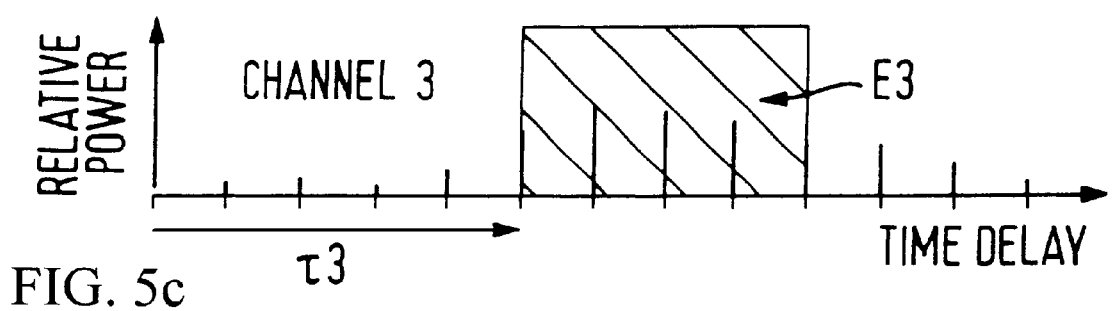
Figure 5D:
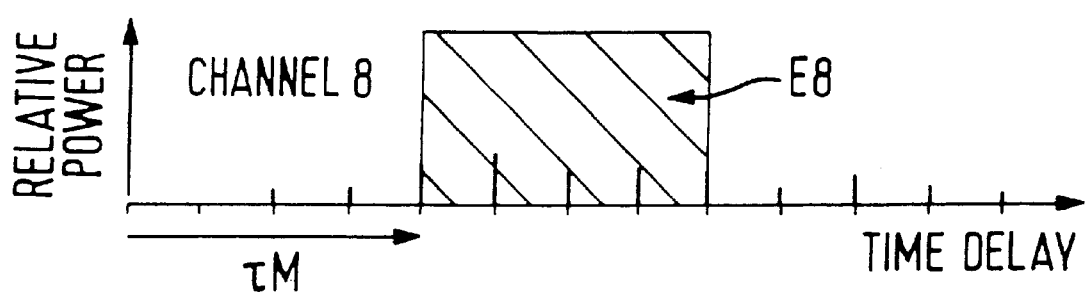

Reference will now be made to FIG. 4 which schematically illustrates the digital signal processor 21. It should be appreciated that the various blocks illustrated in FIG. 4 do not necessarily correspond to separate elements of an actual digital signal processor 21 embodying the present invention. In particular, the various blocks illustrated in FIG. 4 correspond to various functions carried out by the digital signal processor 21. In one embodiment of the present invention, the digital signal processor 21 is at least partially implemented in integrated circuitry and several functions may be carried out by the same element.

Each signal received by the digital signal processor 21 on the respective inputs 19a–h is input to a respective channel impulse response (CIR) estimator block 30. The CIR estimator block 30 includes memory capacity in which the estimated channel impulse response is stored. The CIR estimator block also includes memory capacity for temporarily storing the received signal. The channel impulse response block 30 is arranged to estimate the channel impulse response of the channel of the respective input 19a–h. As already discussed an associated channel can be defined for the given data burst transmitted in the selected frequency band, the allocated time slot and the beam direction from which the signal is received for a single data burst. The beam direction from which a signal is received is ascertained by the Butler matrix circuitry 8 so that a signal received at input 19a of the digital signal processor represents mainly the signal that has been received from the direction of beam $b_1$ and so on. It should be appreciated that the signal received at a given input may also include the side lobes of the signal received on, for example, adjacent inputs.

Each data burst which is transmitted from a mobile station MS to the BTS 4 includes a training sequence TS. However, the training sequence $TS_{RX}$ which is received by the BTS 4 is affected distorted due to noise and also due to multipath effects which leads to interference between adjacent bits of the training sequence. This latter interference is known as intersymbol interference. $TS_{RX}$ is also affected by interference from other mobile stations, for example mobile stations located in other cells or cell sectors using the same frequency may cause co-channel interference. As will be appreciated, a given signal from the MS may follow more than one path to reach the BTS and more than one version of the given signal may be detected by the antenna array 6 from a given direction. The training sequence $TS_{RX}$ which is received from input 19a is cross correlated by the CIR estimator block 30 with a reference training sequence $TS_{REF}$ stored in a data store 32. The reference training sequence $TS_{REF}$ is the same as the training sequence which is initially transmitted by the mobile station. In practice the received training sequence $TS_{RX}$ is a signal modulated onto a carrier frequency while the reference training sequence $TS_{REF}$ is stored as a bit sequence in the data store 32. Accordingly, before cross-correlation is carried out, the stored reference training sequence is similarly modulated. In other words the distorted training sequence received by the BTS 4 is correlated with the undistorted version of the training sequence. In an alternative embodiment of the invention, the received training sequence is demodulated prior to its correlation with the reference training sequence. In this case, the reference training sequence would again have the same form as the received training sequence. In other words, the reference training sequence is not modulated.

The reference training sequence $TS_{REF}$ and the received training sequence $TS_{RX}$ each are of length L corresponding to L bits of data and may for example be 26 bits. The exact location of the received training sequence $TS_{RX}$ within the allocated time slot may be uncertain. This is because the distance of the mobile station MS from the BTS 4 will influence the position of the data burst send by the MS within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n may be 7 or 9. It is preferred that n be an odd number. The n correlations will typically be on either side of the maximum obtained correlation. However, the relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations gives rise to a tap sequence having n values.

Reference is now made to FIG. 5 which shows the channel impulse response for four of the eight possible channels corresponding to the eight spacial directions. In other words, FIG. 5 shows the channel impulse response for four channels corresponding to a given data burst received in four of the eight beam directions from the mobile station, the data burst being in a given frequency band and in a given time slot. The x axis of each of the graphs is a measure of time delay whilst the y axis is a measure of relative power. Each of the lines (or taps) marked on the graph represents the multipath signal received corresponding to a given correlation delay. Each graph will have n lines or taps, with one tap corresponding to each correlation.

From the estimated channel impulse response, it is possible to determine the location of the training sequence within the allotted time slot. The largest tap values will be obtained when the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. The maximum energy for a given channel is calculated as follows:

$$E = \sum_{j=1}^{5} (h_j)^2$$

where h represents the tap amplitude resulting from a cross correlation of the reference training sequence $TS_{REF}$ with the received training sequence $TS_{RX}$. The CIR estimator block 30 calculates the maximum energy for a given channel by using a sliding window technique. In other words, the CIR estimator block 30 considers each set of five adjacent values and calculates the energy from those five values. The five adjacent values giving the maximum energy are selected as representative of the impulse response of that channel. The energy can be regarded as being a measure of the relative strength of the desired signal from a given mobile received by the BTS 4 from a given direction. This process is carried out for each of the eight channels which represent the eight different directions from which the same data burst can be received. The signal which is received with the maximum energy has followed a path which provides the minimum attenuation of that signal.

An analysis block 34 is provided which stores the maximum energy calculated by the CIR estimator block 30 for the respective channel for the five adjacent values selected by the CIR estimator block as being representative of the channel impulse response.

The analysis block 34 may also analyse the channel impulse responses determined by the CIR estimator block 30 to ascertain the minimum delay. The delay is a measure of the position of the received training sequence $TS_{RX}$ in the allotted time slot and hence is a relative measure of the distance travelled by a signal between the mobile station and the BTS 4. The channel with the minimum delay has the signal which has travelled the shortest distance. This shortest distance may in certain cases represent the line of sight path between the mobile station MS and the BTS 4.

The analysis block 34 is arranged to determine the position of the beginning of the window determining the five values providing the maximum energy. The time delay is then determined based on the time between a reference point and the beginning of the window. That reference point may be the common time when the training sequences in each branch start to be correlated, the time corresponding to the earliest window edge of all those branches or a similar common point. In order to accurately compare the various delays of the different channels, a common timing scale is adopted which relies on the synchronisation signal provided by the BTS 4 in order to control the TDMA mode of operation. In other words, the position of the received training sequence $TS_{RX}$ in the allotted time slot is a measure of the time delay. It should be appreciated that in known GSM systems, the delay for a given channel is calculated in order to provide timing advance information. Timing advance information is used to ensure that a signal transmitted by the mobile station to the BTS falls within its allotted time slot. The timing advance information can be determined based on the calculated relative delay and the current timing advance information. If the mobile station MS is far from the base station, then the MS will be instructed by the BTS to send its data burst earlier than if the mobile station MS is close to the BTS.

The results of the analysis carried out by each of the analysis blocks 34 are input to a processor block 36 which determines whether the distance between the mobile station MS and the base transceiver station 4 is greater or less than a predetermined critical value. It should be appreciated that this critical value is dependent on the characteristics of the particular cell and could vary from cell to cell. Typically, the critical value may be around 0.5 to 1 kilometer. The following two methods can be used by the processor block 36 in order to determine the distance between the mobile station and the base transceiver station. Firstly, the timing advance information can be used.

Figure 6A:
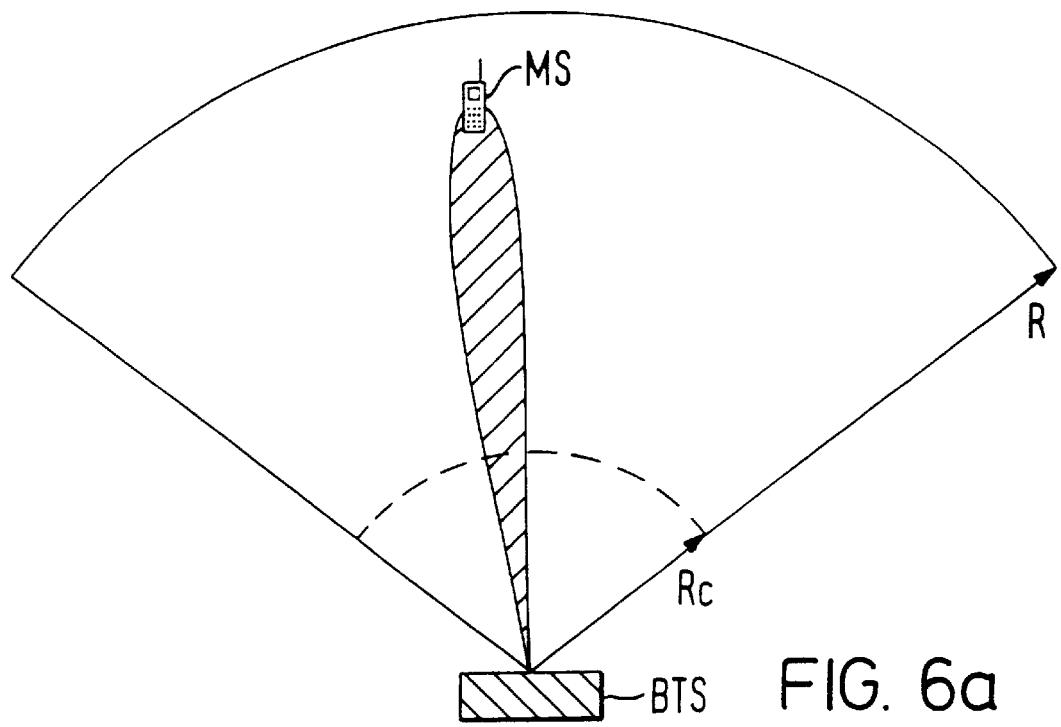
FIG. 6a shows the angle subtended by signals transmitted by the mobile station at the base transceiver station when the distance between the mobile station and the base transceiver station is greater than a given distance.
Figure 6B:
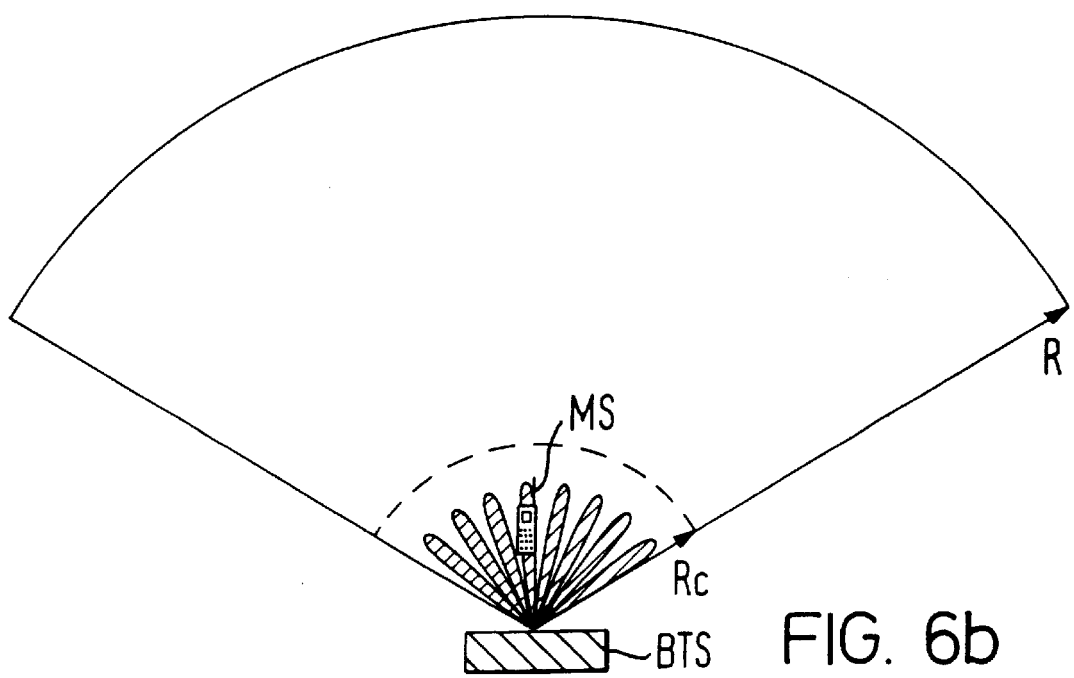
FIG. 6b shows the angle subtended by signals transmitted by the mobile station at the base transceiver station when the distance between the mobile station and the base transceiver station is less than the given distance.

An alternative way of determining the distance between the mobile station and the BTS 4 is to rely on the angle subtended by the received signal at the BTS. From the channel impulse response calculated for each of the eight channels, it is possible to make an estimate of the angle subtended by the received signal at the BTS. If the mobile station is beyond the critical distance from the BTS 4, then the angle subtended by the received signal at the BTS will be relatively narrow as illustrated in FIG. 6a. If the angle subtended at the BTS is relatively narrow, then the signal from the MS will be strongly received only in a limited number of directions, for example one, two or possibly three. On the other hand, if the distance between the BTS 4 and the MS is below the critical distance, the angle subtended at the BTS will be relatively wide as illustrated in FIG. 6b. The signal received from the MS will be received on a relatively large number of channels for example four or more and the signal will be received with a similar strength on each of the four or more channels.

By looking at the energy of each channel, the processor block 36 ascertains the number of channels on which a signal is received. If the signal on a given channel is weak, then the signal received on that channel may be ignored. From the number of channels on which the signal is received, it can be determined if the angle subtended by the received signal has a wide or narrow angular spread and hence whether the distance between the MS and the BTS is greater than or less than the critical value.

If the distance between the mobile station and the BTS 4 is greater than the critical value $R_c$, then only one or two beam directions only will be used to transmit a signal to that mobile station. On the other hand, if the distance between a mobile station and the BTS 4 is less than the critical value $R_c$, the signal to be transmitted to the MS will be transmitted over a relatively large number of beams.

In one modification to the present invention, when the distance between the BTS 4 and the MS is determined to be greater than the critical distance, then the processor block 36 compares the maximum energy determined for each channel and also compares the determined delay for each channel. The processor block 36 ascertains which channel has the maximum energy for a given data burst in a given frequency band in a given time slot. This means that the beam direction from which the strongest version of a given data burst is received can be ascertained. The processor block 36 also ascertains which of the channels has a minimum delay. In other words, the version of the data burst which has followed the shortest path can be ascertained. The processor block 36 then checks to see whether or not the channel having the maximum energy is the same as the channel having the minimum delay. If these channels are the same the processor block 36 outputs a signal to generating block 38 indicating that the next signal to the mobile station in question should be transmitted in the single beam direction from which the signal having the greatest strength and shortest path has been received.

If, however, the channel which has the greatest energy is not the same as the channel which has the signal which first reaches the BTS 4, the processor block 36 outputs a signal to generating block 38 indicating that the next signal to be transmitted to the mobile station MS, from which the data burst has been received, should be transmitted in two beam directions. One direction will correspond to the beam direction from which the strongest signal is received and the other direction will correspond to the beam direction from which the data burst is first received. For example, if the comparison block 36 ascertains that the strongest signal has been input to the digital signal processor 21 on input 19b whilst the signal which first reaches the BTS 4 has been input to the digital signal processor 21 via input 19d, the signal from the BTS to the mobile would be transmitted in the directions of beams $b_2$ and $b_4$. In those circumstances, the signal to be transmitted would be output by the generating block 38 on outputs 22b and 22d of the digital signal processor 21.

In an alternative modification to the present invention, when the distance between the BTS 4 and the MS is determined to be greater than a critical distance, then the processor block 36 compares the channel impulse response determined for each channel and selects a principal beam direction. The principal beam direction may be the direction from which the signal having the greatest energy is received or alternatively may be the direction from which the signal having the least delay is received. The processor block 36 then selects two auxiliary beam directions, these auxiliary beam directions being immediately adjacent to the principal direction. In other words, if the beam $b_3$ is the principal beam, then beams $b_2$ and $b_4$ will be the auxiliary beams. The processor block 36 also selects the power level for the principal beam. The power of the principal beam may be selected in accordance with the strength of the signal received from the mobile station in that principal beam direction or indeed by using any other suitable method. The power of each of the auxiliary beams is then set in accordance with the power selected for the principal beam. For example, the ratio of the power in the principal beam direction to the power in one of the auxiliary beam directions is proportional to the ratio of the signal level received in the principal beam direction from the mobile station to the signal level received in that auxiliary beam direction from the mobile station. Generally, the power of the auxiliary beams will be less than that of the principal beam.

In a further modification to the present invention, when the distance between the BTS 4 and the MS is determined to be greater than the critical distance, then the comparison block selects a direction from which the signal from the mobile station is deemed to be received. That may be the direction from which the signal having the greatest energy is received or alternatively may be the direction from which the signal having the least delay is received. Processor block 36 stores this beam direction and carries out the same procedure for the next data burst received from the mobile station. The directions from which the two consecutive signals have been received from the mobile station are compared. If the two directions are the same, then the signal from the BTS will be transmitted to the mobile station in that determined beam direction. If, on the other hand, consecutive data bursts from the mobile station are deemed to come from different directions, then the next signal transmitted by the BTS 4 to the MS will be in both of those beam directions.

The strength of the signal transmitted by the BTS 4 to the MS will depend on the distance between the BTS and MS. When the distance between the MS and the BTS is determined to be less than the critical distance, the signal transmitted to the MS in the relatively large number of beam directions has a first relatively low power level. However, when it is determined that the distance between the MS and the BTS 4 is greater than the critical distance, then the power of the signal transmitted in the one or two beam directions has a second, higher power level. Instead of just having two different power levels, the power of the signal transmitted by the BTS can have a range of possible values, depending on the distance between the MS and the BTS. Based on the determined distance between the MS and the BTS, the processor block 36 determines the appropriate signal level based on the distance between the MS and the BTS and will output signal level information along with the information on the selected beam direction to the generating block 38. For example, a closed loop system can be used to determine the power level when the distance is greater than the critical system. Such a closed loop system is used in the GSM system.

Generating block 38 is responsible for generating the signals which are to be output from the digital signal processor 21. The generating block 38 has an input 40 representative of the speech and/or information to be transmitted to the mobile station MS. Generating block 38 is responsible for encoding the speech or information to be sent to the mobile station MS and includes a training sequence and a synchronising sequence within the signals. Generating block 38 is also responsible for production of the modulating signals. Based on the generated signal and determined beam direction, generating block 38 provides signals on the respective outputs 22a–h of the digital signal processor 21. The generating block 38 also provides an output 50 which is used to control the amplification provided by amplifiers 24 to ensure that the signals in the required beam direction or directions have the required power levels which are selected by the processor block 36.

The output of the channel impulse response block 30 is also used to equalise and match the signals received from the mobile station MS. In particular, the effects of intersymbol interference resulting from multipath propagation can be removed or alleviated from the received signal by the matched filter (MF) and equalizer block 42. It should be appreciated that the matched filter (MF) and equalizer block has an input (not shown) to receive the received signal from the MS. The output of each block 42 is received by recovery block 44 which is responsible for recovering the speech and/or the information sent by the MS. The steps carried out by the recovery block include demodulating and decoding the signal. The recovered speech or information is output on output 48.

In one modification, the wide angular spread can be achieved by field modulation.

In one modification to the described embodiment, if the distance between the mobile and the BTS is greater than the critical distance, there is normal beam and power control, for example as in the GSM system. However, if the distance between the mobile and the BTS is less than the critical distance, the beams which are selected are fixed and a fixed power level is also used.

It should be appreciated that whilst the above described embodiment has been implemented in a GSM cellular communication network, it is possible that the present invention can be used with other digital cellular communication networks as well as analogue cellular networks. The above described embodiment uses a phased array having eight elements. It is of course possible for the array to have any number of elements. Alternatively, the phased array could be replaced by discrete directional antennae each of which radiates a beam in a given direction. The Butler matrix circuitry can be replaced by any other suitable phase shifting circuitry, where such circuitry is required. The Butler matrix circuitry is an analogue beam former. It is of course possible to use a digital beam former DBF or any other suitable type of analogue beam former. The array may be controlled to produce more than eight beams, even if only eight elements are provided, depending on the signals supplied to those elements.

It is also possible for a plurality of phased arrays to be provided. The phased arrays may provide a different number of beams. When a wide angular spread is required, the array having the lower number of elements is used and when a relatively narrow is required, the array having the larger number of elements is used.

As will be appreciated, the above embodiment has been described as providing eight outputs from the Butler matrix circuitry. In practice a number of different channels will be output on each output of the Butler matrix at the same time. Those channels may be on different frequency bands. The channels for different time slots will also be provided on the respective outputs. Whilst individual amplifiers, processors, analogue to digital converters and digital to analogue converters have been shown, these in practice may be each provided by a single element which has a plurality of inputs and outputs.

It should be appreciated that embodiments of the present invention have applications other than just in cellular communication networks. For example, embodiments of the present invention may be used in any environment which requires directional radio communication. For example, this technique may be used in PMR (Private Mobile Radio) or the like.

What is claimed is:

1. A method of directional radio communication in a mobile communication network between a first station and a second mobile station, said method comprising the steps of:

receiving at said first station a signal transmitted by said second station;

monitoring a parameter representative of a distance between the second station and the first station; and transmitting a signal beam from said first station to said second station, wherein an angular spread and a transmission power of the signal beam transmitted by the first station is dependent on the distance between the first and second stations as indicated by the parameter, such that when the distance is relatively large, the beam is narrower and transmitted at a higher power than when the distance is relatively small.

2. A method as claimed in claim 1, wherein the parameter is monitored at the first station.

3. A method as claimed in claim 2, wherein the parameter is the angular spread of the signal received by the first station from the second station.

4. A method as claimed in claim 2, wherein the parameter is determined based on the length of time taken for the signal from the second station to reach the first station.

5. A method as claimed in claim 1, wherein said parameter is timing advance information normally provided for controlling communication of data between the mobile station and the first station.

6. A method as claimed in claim 1, wherein the angular spread of the radiation beam is selectable from a first relatively wide beam and a second relatively narrow beam, wherein the first wide beam is selected if the distance between the first station and the second station is less than a predetermined distance and the second beam is selected if the distance between the first station and the second station is greater than the predetermined distance.

7. A method as claimed in claim 1, wherein said first station comprises a base transceiver station of a cellular communications network and the second station is a mobile station.

8. A method of directional radio communication in a cellular mobile communication network between a base station and a mobile station, said method comprising the steps of:

receiving at said base station a signal transmitted by said mobile station;

monitoring a parameter representative of a distance traveled by said signal between the mobile station and the base station; and selectively determining an angular spread and a transmission power of a radiation beam for transmitting a second signal from said base station to said mobile station in dependence on the distance represented by said parameter, wherein the angular spread of the beam transmitting said second signal is reduced, and the transmission power increased, for an increased distance.

9. A first station for directional radio communication in a mobile communication network with a second mobile station, said first station comprising:

receiver means for receiving a signal transmitted by said second station;

transmitter means for transmitting a signal beam from the first station to the second station; and control means for selectively determining an angular spread of the signal beam, said control means being arranged to control said transmitter means so that the angular spread and a transmission power of the signal beam transmitted by the first station is dependent on a parameter representative of a distance between the first and second stations, wherein when the distance is relatively large, the beam is narrower and transmitted at a higher power than when the distance is relatively small.

10. A first station as claimed in claim 9, wherein said control means is arranged to control the angular spread of the transmitted beam to be a first relatively wide beam if the distance between the first and second stations is less than a predetermined distance and to be a second relatively narrow beam if the distance between the first and second stations is greater than the predetermined distance.

11. A first station as claimed in claim 9, wherein the transmitter means and the receiver means are provided by an antenna array which is arranged to provide a plurality of beam directions for transmitting a radiation beam, wherein at least one of said beam directions can be selected for a given signal.

* * * * *